(12) United States Patent
Error

(10) Patent No.: US 8,024,651 B1
(45) Date of Patent: Sep. 20, 2011

(54) DATA VISUALIZATION USING TABLES INTEGRATED WITH HIERARCHICAL PIE CHARTS

(75) Inventor: Christopher Reid Error, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 834 days.

(21) Appl. No.: 11/669,152

(22) Filed: Jan. 30, 2007

(51) Int. Cl.
*G06F 17/27* (2006.01)
(52) U.S. Cl. ......................................... 715/215; 715/212
(58) Field of Classification Search .................. 715/212, 715/215
See application file for complete search history.

(56) References Cited

U.S. PATENT DOCUMENTS

| | | | |
|---|---|---|---|
| 6,633,316 B1 * | 10/2003 | Maddalozzo et al. | 715/854 |
| 2004/0098229 A1 | 5/2004 | Error et al. | |
| 2004/0122943 A1 | 6/2004 | Error et al. | |
| 2004/0254942 A1 | 12/2004 | Error et al. | |
| 2005/0114510 A1 | 5/2005 | Error et al. | |
| 2005/0216844 A1 | 9/2005 | Error et al. | |
| 2006/0123340 A1 | 6/2006 | Bailey et al. | |
| 2006/0212833 A1 * | 9/2006 | Gallagher et al. | 715/848 |
| 2006/0274761 A1 | 12/2006 | Error et al. | |
| 2006/0274763 A1 | 12/2006 | Error | |
| 2006/0277087 A1 | 12/2006 | Error | |
| 2006/0277212 A1 | 12/2006 | Error | |
| 2006/0277585 A1 | 12/2006 | Error et al. | |
| 2007/0011304 A1 | 1/2007 | Error | |
| 2007/0126736 A1 * | 6/2007 | Tolle et al. | 345/440 |

OTHER PUBLICATIONS

Matthew MacDonald; Excel: The Missing Manual; O'Reilly Media, Inc.; Dec. 22, 2004, pp. 5, 416, 423-424, 450, 456-458, and 477-478.*
SiteCatalyst Implementation Manual; Omniture; Oct. 28, 2005, p. 1, § 1.1.*
Jon Peltier; Pie of Pie Charts and Other Pie Chart Tricks; Dec. 2004; Tech Trax; pp. 6, 9.*
"InspireData-Features." accessed at inspiration.com/productinfo/inspiredata/index.cfin? fuseaction=features>. Dec. 20, 2006. pp. 1-5.
"Graphics automation with graphs, tables, charts, maps, diagrams, and text in Word PowerPoint Excel Adobe PDF HTML." accessed at appiananalytics.com/solutions/reportautomationgallery.html>. Dec. 20, 2006. pp. 1-6.
"MGRID—Portal Howto." accessed at mgrid.umich.edu/proj ects/portal howto/howto resource use.html>. Dec. 20, 2006. pp. 1-3.
"SunBurst Page." accessed at cc.gatech.edu/gvu/ii/sunburst/>. Dec. 20, 2006. pp. 1-4.
"Circular Treemaps." accessed at lip.sourceforge.net/ctreemap. html>. Dec. 20, 2006. pp. 1-6.

(Continued)

*Primary Examiner* — Doug Hutton
*Assistant Examiner* — Andrew R Dyer
(74) *Attorney, Agent, or Firm* — Robert C. Kowert; Meyertons, Hood, Kivlin, Kowert & Goetzel, P.C.

(57) ABSTRACT

Tools and techniques are provided to visualize and manage data. A hierarchical pie chart is placed in operational correspondence with a hierarchical table. Slices of a pie chart level correspond to nodes of a table level. When a user causes a change in a node/slice, the software automatically performs a matching change in the corresponding slice/node. This occurs for operational changes such as selection, creation, deletion, expanding (zoom in, drill down), contracting, updating data, and changing a label. The path taken through the table to reach the present data breakdown may also be displayed.

20 Claims, 3 Drawing Sheets

OTHER PUBLICATIONS

"Freeware Section." Screenshots from steffengerlach.de/freeware>. Dec. 20, 2006. pp. 1-2.

"Omniture SiteCatalyst 7.1 reviewed by PC Magazine." accessed at pcmag.com/print_article2/0.1217. a=28937.00.asp>. Aug. 1, 2002. p. 1.

"Omniture Shatters Traditional Web Analysis Boundaries with Breakthrough Omniture Discover™ Tool." accessed at omniture.com/press/187>. Jun. 8, 2005. pp. 1-3.

John Stasko and Eugene Zhang, "Focus+Context Display and Navigation Techniques for Enhancing Radial, Space-Filling Hierarchy Visualizations." Technical Report GIT-GVU-00-12. GVU Center and College of Computing Georgia Institute of Technology, Atlanta, GA. Aug. 2000. pp. 1-13.

"Microsoft Office for Windows Product Enhancement Guide." Microsoft. 1997. pp. 1-55.

"IBM Tivoli Usage and Accounting Manager Web Reporting User's Guide, Version 6.1." accessed at <publib.boulder.ibm.com>. Sep. 2006. pp. 1-4.

"Site Catalyst Implementation Manual." accessed w2.byuh.edu/webmasters/> Oct. 18, 2006. Copyright Oct. 28, 2005. pp. 1-207.

"Gallery of Data Visualization—Historical Milestones." accessed at math.yorku.calSCS/Gallery/historical.html>. Oct. 26, 2006. pp. 1-7.

"Circos—circularly composited genome data and annotation generator." accessed at mkweb.bcgsc.ca/circos/>. Copyright 2004-2006. pp. 1-2.

"Data-visualization | tags | codablog | Coda Hale." accessed at blog.codahale.com/tags/data-visualization|>. Copyright 2005-2006. pp. 1-7.

"Pie of Pie Charts and other Pie Chart Tricks." accessed at pubs.logicalexpressions.com/pub0009/LPMArticle. asp?ID=471>. Copyright 2002-2007. pp. 1-10.

"Data Mining: Text Mining, Visualization and Social Media: Radial Treemaps." accessed at datamining.typepad.com/data mining/2006/07/radial treemaps.html>. Jul. 29, 2006. pp. 1-2.

"Radial Treemap for US Auto Sales." accessed at neoformix.com/2006/MLPCUSAutoSales2006JanJun. htmi>. Jul. 27, 2006. pp. 1-3.

"LogiXML Developer Network." accessed at logixml.com/devnet/rdPage.aspxrdReport=Default&rdRnd=85969>. Copyright 2007. pp. 1-2.

"Default Safari Online." accessed at safari5.bvdep.com/0789729695/ch091evlsecl>. Copyright 2006. pp. 1-3.

"Event Management Reports." available at publib.boulder.ibm.com/tividd/td/TRM/GC32-1323-00/en_US/HTML/admin145.ht>. Jan. 31, 2007. pp. 1-2.

"Graphing Tutorial." accessed at nces.ed.gov/nceskids/pdf/graph_tutorial.pdf>. Dec. 17, 2006. pp. 1-18.

* cited by examiner

DATA VISUALIZATION USING TABLES INTEGRATED WITH HIERARCHICAL PIE CHARTS

BACKGROUND

Web site usage via browsers is regularly tracked and analyzed by commercially available web analytics services, which gather detailed data about web page usage, and to some extent about particular web site users. Entities which provide other entities with web analytics services are referred to as "analytics providers". One leading web analytics provider is Omniture, Inc., of Orem, Utah, the owner of the present invention. Omniture provides web analytics technology under its well-known mark SiteCatalyst™. All other marks used herein are property of their respective owners.

At present web analytics data are typically collected from server logs or using web-beacons. Web-beacons are small image requests placed in a web page to cause communication between the user's device and a server. The server may be controlled by the analytics provider, by the vendor whose website contains the web-beacons, or by another party. Web-beacons are also known as clear GIFs, web bugs, image requests, or pixel tags. Web-beacons can be used for advertising, behavioral targeting, and other processes, to gather information a visits to websites. Web-beacons are commonly used by analytics providers to gather analytics data.

Web analytics data is more useful when it is presented in a manner that answers pertinent business questions. Toward that end, Omniture has provided various tools and services which filter, visualize, organize, and otherwise help manage raw analytics data in order to help Omniture clients and partners improve their web sites and services. In particular, Omniture has commercially provided reporting tools which present results in at least tabular form, funnel graphs, conventional pie chart formats, overlays on tracked web pages, bar charts, line graphs, maps, and/or plots. Other data visualization tools are also available.

Other concepts related to the present invention may be known, or become apparent through sources other than this background, including without limitation the references being made of record in connection with the present document.

SUMMARY

The present invention provides tools and techniques for displaying information in a user interface. In one embodiment, the invention provides a method of configuring a computer display by displaying slices from at least two levels of a hierarchical pie chart, and displaying nodes from a hierarchical table which correspond to at least some of the displayed hierarchical pie chart slices. The pie chart slices and the table nodes may be displayed simultaneously, and both may be displayed in the same window. They may visually correspond by having the same or similar labels, data values, coloring, and/or position in their respective hierarchies, for example. They may operationally correspond in that user action on one of them causes an automatic (no further user action required) similar action on the other. For instance, the invention may automatically show a pie chart slice as selected in response to user input which selects a table node corresponding to that slice. Likewise, it may automatically show a node as selected in response to input which selects a slice corresponding to that node. Similar operational correspondence may be implemented for other actions, e.g., expanding or contracting a node/slice to show greater or lesser detail, respectively; changing a node/slice displayed data value; changing a node/slice displayed label; changing a pie chart/table displayed label; deleting a node/slice/entire table/entire pie chart; creating node/slice/entire table/entire pie chart; moving display location/position in hierarchy; resizing a displayed item; selecting. In some embodiments, the display shows the path taken by a user through the hierarchical table to reach a currently displayed node of the hierarchical table.

In addition to methods, the invention may be embodied in configured storage media such as RAM or CDs, in computing systems, and other embodiments. Thus, some embodiments include a memory for storing data for access by an application program being executed on a data processing system, with a data structure stored in the memory, the data structure including information resident in a web analytics database used by the application program, the data structure including levels of a hierarchical pie chart which is stored in the memory and which includes information from the web analytics database, and a hierarchical table which is stored in the memory and which includes nodes that correspond in relative position and in information content to slices of the hierarchical pie chart. These examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

DETAILED DESCRIPTION

Introduction

Figure 1:
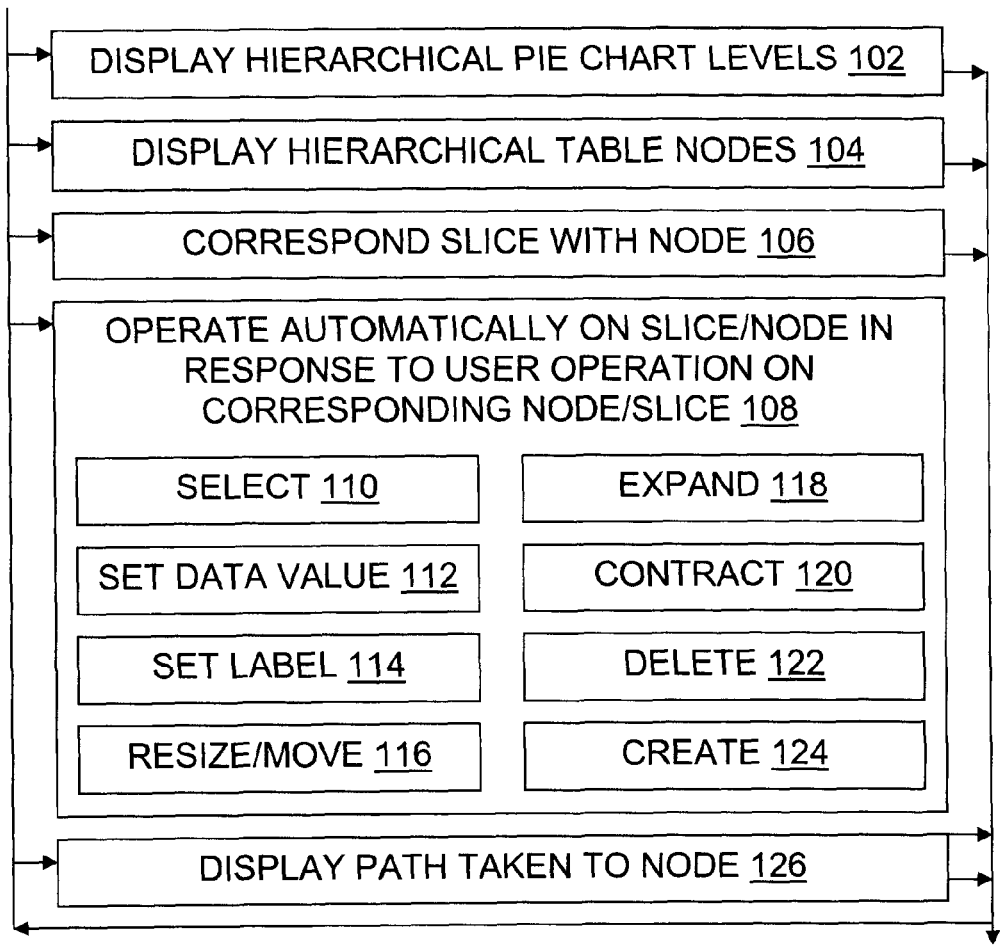
FIG. 1 is a flow chart illustrating methods for displaying corresponding hierarchical pie charts and tables, according to at least one embodiment of the present invention.

The present invention provides tools and techniques for user interfaces which visualize and manage database information. The invention arose in the context of reporting software to visualize and manage web analytics data, but is not limited to such data. More generally, although the invention is illustrated in discussions herein and in the drawing figures by specific examples, it must be understood that other embodiments of the invention may depart from these examples. Thus, specific features of an example may be omitted, renamed, grouped differently, repeated, instantiated in hardware and/or software differently, performed in a different order, or be a mix of features appearing in two or more of the examples. Analytics providers are cited in examples herein, but the inventive methods and systems can also be used by other entities.

Definitions of terms are provided explicitly and implicitly throughout this document. Terms do not necessarily have the same meaning here that they have in general usage, in the usage of a particular industry, or in a particular dictionary or set of dictionaries. The term "correspond" has special meaning herein, for example, as indicated by use of a reference number with that term. The inventor asserts and exercises his right to be his own lexicographer, with respect to both coined terms and other terms.

It is not necessary for every inventive embodiment or configuration to include every component shown in the figures or discussed in the text, or to include components in the same numbers and relationships shown here. The figures and textual descriptions are merely examples.

Methods, Display Examples, and More

FIG. 1 illustrates some methods of the present invention. Reference is also made to additional figures below, because an understanding of the inventive systems and devices will help an understanding of the methods, and vice versa.

During a hierarchical pie chart displaying step 102, slices from at least two levels of a hierarchical pie chart are displayed on a screen 206 of a computer 202 or other device. Pie charts are charts in which a circle, oval, ellipse, cylinder, cone, or other arcuate or N-gon (N>4) shape is divided into slices which represent parts or portions of some total. Pie charts themselves are well known. They come in various versions which differ according to 2D versus 3D appearance, color versus pattern or other visual texture, conjoined segments versus partially or fully exploded (spatially separated) segments, presence or absence of textual labels, and other display characteristics 310.

The mathematical relationship between radius, position, area, and other geometric display characteristics, on the one and, and the underlying data value for a slice, on the other hand, also varies from one pie chart version to another. In one version, the size of the slice's data relative to the total amount for all slices of that pie chart is reflected in the relative displayed arc of the slice (e.g., total data gets the full 360 degrees of arc in a circle), for example, whereas in another version the size of a slice's data relative to the total is reflected in the relative area displayed. In yet another version, the slices may be equal in size and in area, but will generally vary in height along a third axis, and the pie chart appears three-dimensional.

From the perspective of the present invention, pie charts which deal with only a single total have just one level; they are not hierarchical. Pie-within-a-pie charts are also known. These include two related pie charts, of one level 302 each, in which one slice 304 of one pie chart provides the total for all slices of the other pie chart. Thus, the two pie charts are placed in a hierarchy relative to one another. Multilevel hierarchical pie charts of various types are also known. As with single-level pie charts, multi-level pie charts may be displayed using various colors, labels, apparent three-dimensionality, and other display characteristics 310. In addition, lines, arrows, position, and other display characteristics 310 may be used to indicate their hierarchical relationship.

During a hierarchical table displaying step 104, nodes 306 of a hierarchical table 216 are likewise displayed. At least one of the nodes corresponds in at least its respective hierarchical position to at least one of the displayed hierarchical pie chart slices 304. Tables are arrays, matrices, columns, or other rectangular (in N dimensions, N>=1) arrangements of data values; the data values in tables are often, but not necessarily always, numeric. Tables themselves are well known. A row of a table may serve as a node in a hierarchy of nodes, allowing one to drill down into the table to display additional detail. Drilling down into data is sometimes called breaking down the data, particularly when filters and searches are done as one goes deeper into the data hierarchy.

Columns and rows are sometimes somewhat interchangeable in that either may be defined as a node. Tables 216 have levels 314, e.g., all nodes (rows) at a given level of detail. Tables 216 also have display characteristics 316, such as color, font, and screen position.

In an embodiment of the invention, at least one slice 304 of a hierarchical pie chart 214 corresponds 106 with a node 306 of a hierarchical table 216. Thus, the pie chart and the table are integrated with one another. In some embodiments, each slice 304 corresponds to a node 306, and in some each node 306 corresponds to a slice 304. But full correspondence of slices and/or nodes with their counterparts (nodes and/or slices) is not necessarily required in every embodiment. For instance, some node might have no corresponding slice because the slice would be too narrow to display.

Before examining pie chart-table correspondences in more detail, consider a simple example of a hierarchical pie chart in correspondence 106 with a hierarchical table. Suppose a dataset 218 identifies 30 items of type A, 20 of type B, and 50 of type C. Suppose also that 15 of the A type items have a certain characteristic, namely, they are of model R, and the remaining 15 items of type A are of model S. Items of type A could have other characteristics as well, which are not used in this example. Likewise, characteristics of B type items and C type items may be pertinent in other contexts, but are not needed in this example. This dataset could be represented, visualized, and otherwise managed using a hierarchical pie chart in correspondence with a hierarchical table according to the present invention, as illustrated in the snapshot shown in FIG. 3.

A display window 308 is configured by code (data and instructions) in an embodiment of the invention to display a hierarchical pie chart 214 and a hierarchical table 216 based on the dataset just described. Two levels 302 of the pie chart are displayed. The level on the left has three slices 304, one for the A type items, one for the B type items, and one for the C type items. Slices may also be called segments. In this example, the arc allocated to a slice is proportional to the slice's number of items relative to all items in the slice's level. Thus, half of the items are of type C, so the leftmost slice is displayed in half of the circle that represents the entire level. The slice for type A items has been expanded 118 to show a second level, which is depicted in the rightmost circle in FIG. 3. This second level 302 has two slices 304, one for model R items and one for model S items. The hierarchical table 216 is displayed simultaneously with the hierarchical pie chart 214, and in this example they are displayed in the same window 308. In other embodiments they may be displayed in different windows and/or at different times, provided they correspond 106 in some manner as discussed herein. Nodes 306 of the table 216 correspond to slices 304 of the pie chart 214. In this example, black-and-white patterns are used to label the slices and text is used to label the nodes, but in other examples nodes and slices may be labeled with any one or more of: colors, patterns, textures, text, sounds, animations, video clips, for example.

Figure 4:
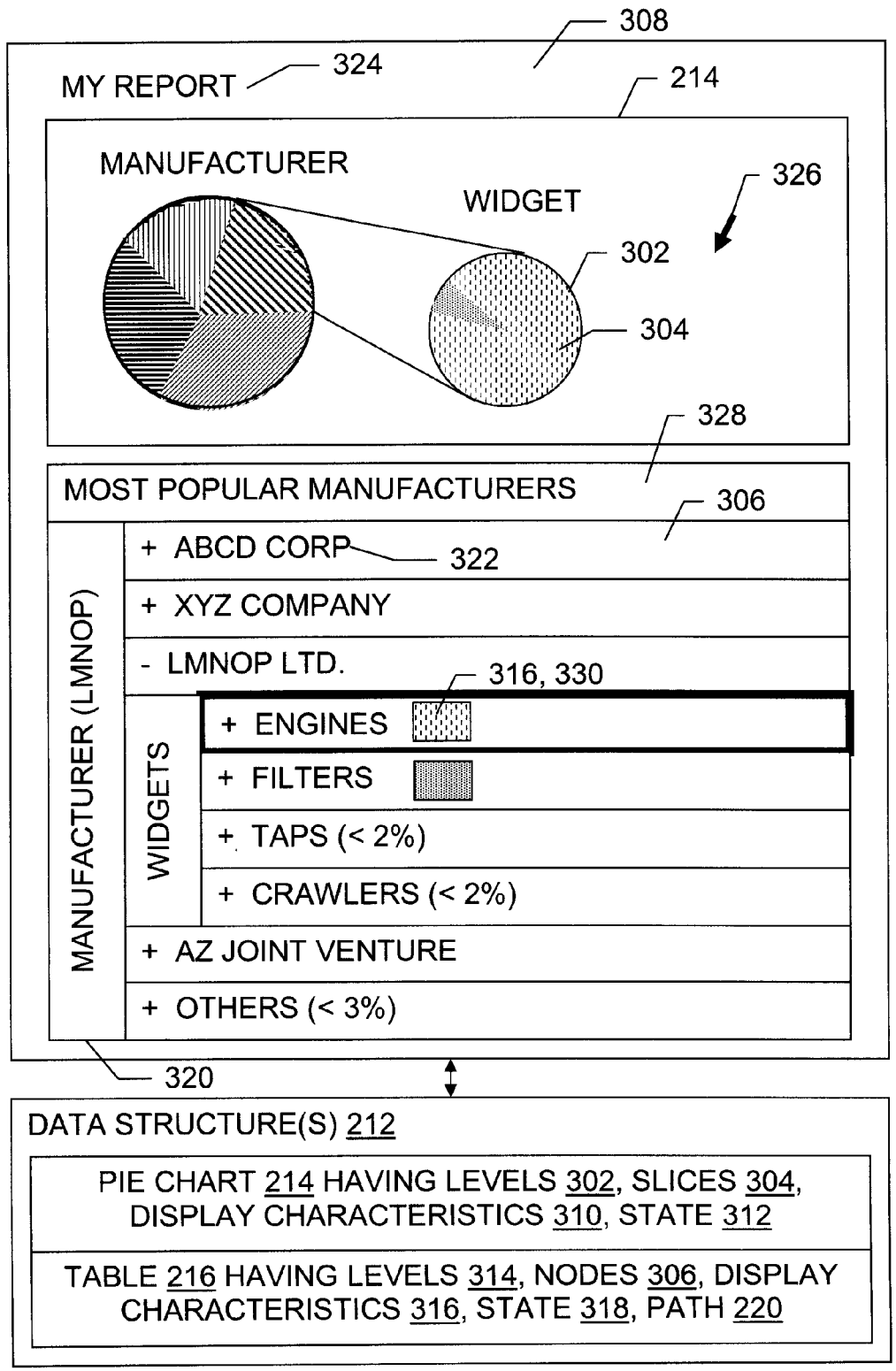
FIG. 4 is a diagram illustrating a screen display and underlying data structures according to some embodiments of the present invention.

A more detailed example is given in FIG. 4. A display window 308 is configured to show a hierarchical pie chart 214 which is in correspondence 106 with a hierarchical table 216. The leftmost circle, with four slices 304, represents one level 302, while the smaller circle located to the right of it has two slices 304 in its level 302. Two levels 302 of the pie chart 214 are drawn in this example, but in other examples of the invention one level might be displayed at a given point in time, and more than two levels 302 might be displayed simultaneously in some examples according to the invention.

The hierarchical table 216 of this example has displayed nodes 306 positioned in its hierarchy at a level 314 corresponding to the level of the leftmost pie chart circle 214 above it. Of course, the table 216 could be located to the side of the pie chart 214, or above it, or even on another tab or another window, in other examples. The illustrated table 216 level 314 has four nodes 306, each one corresponding 106 to one of the four slices 304 shown in the leftmost pie chart 214 circle. This table 216 also has a fifth node 306, labeled "others", which has no corresponding displayed slice, because it falls below a predefined cutoff threshold. Such thresholds may be user-defined, preprogrammed, or both.

In this example, each table node has a clickable icon which can be used to expand 118 or contract 120 the node, to display greater or lesser amounts of detail. In the example, the icon shows as a plus sign when the node can be expanded, and shows as a minus sign when the node can be contracted. The node with data value 322 "LMNOP Ltd." is expanded in the table, and the corresponding slice 304 of the pie chart is expanded to provide the level 302 shown in the rightmost circle. The nodes and corresponding slices of that level also have been labeled 330 with the same pattern as one another, to help users note their correspondence 106 with each other. Of course, correspondence 106 can also be noted in other ways, such as matching text labels, or matching colors, for example.

Figure 3:
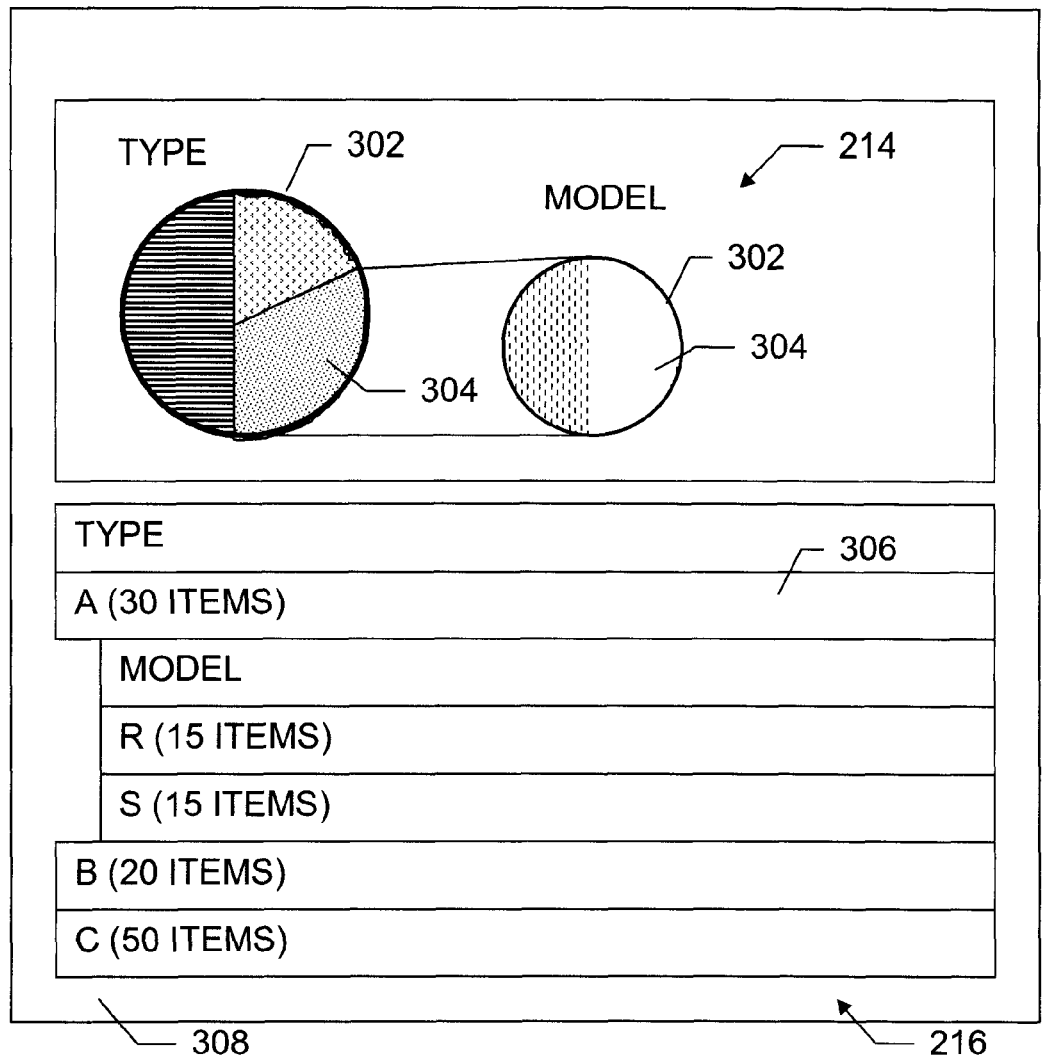
FIG. 3 is a diagram illustrating a simplified screen display for an example dataset according to an embodiment of the present invention.

The example of FIG. 4 contains some features not shown in the example of FIG. 3. For instance, the FIG. 4 window 308 displays a title 324 for the combined pie chart 214 and table 216 as an integrated unit. It also contains a title 328 serving to label a table level 314. FIG. 4 also shows a path or history display 320, which represents, as a navigation aid, the path 220 taken by the user through the table 216 (and hence through the pie chart 214) to reach the present position in the table-pie-chart hierarchy. In this example, the present position is at the expanded node LMNOP Ltd. component node labeled "Engines". This position in the hierarchy is shown in the example by bolder outlining of the table entry, but it could be shown in other ways, e.g., by color, flashing, cursor 326 position, or other visual tools that provide user feedback as to context. The path 220 is displayed as a sideways hierarchy label recital 320 in this example, but other representations could be used, such as a tree, a list of steps taken, a list of search keywords, a differently oriented list of labels passed, and/or a replay of those labels, for example. Although not shown in the Figures, embodiments of the invention may also include buttons, scroll bars, tabs, hyperlinks, menus, and other user navigation aids, as well as interface features like drag-and-drop capability.

The hierarchical pie chart 214 and the hierarchical table 216 are not merely displayed together. Rather, these two data structures 212—the pie chart 214 and the table 216—correspond 106 to one another. They may correspond 106 through automatic display coordination, automatic operational coordination, automatically shared data values, internally linked respective corresponding slices and nodes, or some combination of these factors. They may be implemented as separate but coordinated data structures 212, or as integral parts of a single data structure 212, depending on the programming language used, programmer preferences, and similar design questions. Examples of correspondence 106 discussed below illustrate some of the possible embodiments.

In some embodiments, correspondence 106 is evident because an application program 208 enforces 108 at least one of the following conditions: a slice 304 and a corresponding node 306 each have the same data value 322 displayed 102, 104; a slice 304 and a corresponding node 306 each have the same label 330 displayed 102, 104.

In some embodiments, correspondence 106 requires an application program 208 to automatically 108 show 102 a slice 304 as selected in response to input which selects 110 a node 306 corresponding to that slice 304, and/or to automatically 108 show 104 a node 306 as selected in response to input which selects 110 a slice 304 corresponding to that node. Selecting 110 a slice/node may be accomplished, for instance, in response to a user moving a cursor 326 over the slice/node, or in response to a search such as a keyword or key data value search.

In some embodiments, correspondence 106 requires an application program 208 to automatically 108 expand 118 a slice 304 in response to input which expands a node 306 corresponding to that slice, and/or to automatically 108 expand 118 a node 306 in response to input which expands a slice 304 corresponding to that node.

In some embodiments, correspondence 106 requires an application program 208 to automatically 108 change 112 a data value 322 of a slice 304 in response to input which changes a data value of a node 306 corresponding to that slice, and/or to automatically 108 change 112 a data value of a node 306 in response to input which changes a data value of a slice 304 corresponding to that node, so that the data values 322 in corresponding nodes and slices are equal from the user's point of view when interfacing with the program through the display. Each displayed instance of the data value 322, whether shown in a slice or in a corresponding node, is based on the same underlying database value 218.

In some embodiments, correspondence 106 requires an application program 208 to automatically 108 change 114 a label 330 of a slice 304 in response to input which changes a label of a node 306 corresponding to that slice, and/or to automatically 108 change 114 a label 330 of a node 306 in response to input which changes a label of a slice 304 corresponding to that node. In some embodiments, some slices 304 and their corresponding nodes 306 have no label but users may use these counterparts' shared data value to identify them, thereby treating the data value 322 as a label 330.

In some embodiments, correspondence 106 requires an application program 208 to automatically 108 delete 122 a slice 304 in response to input which deletes a node 306 corresponding to that slice, to automatically 108 delete 122 a node 306 in response to input which deletes a slice 304 corresponding to that node, to automatically 108 create 124 a slice 304 in response to input which creates a node 306, and/or to automatically 108 create 124 a node 306 in response to input which creates a slice 304. In some cases, slices are not created for corresponding nodes whose data values meet some predefined conditions, such as being considered too small to make a pie slice visible if it is sized and positioned using the rules by which the other slices are sized and positioned.

More generally, in some embodiments the invention automatically (without requiring further user input) performs 108 an operation on the pie chart 214 in response to input which caused performance of the operation on the corresponding table 216, and likewise automatically performs 108 an operation on the table 216 in response to input which caused performance of the operation on the corresponding pie chart 214. Thus, the pie chart and the table are integrated. The operations performed 108 may include one or more of the following, for example: selecting 110 a pie chart/table/slice/node, expanding 118 a slice/node to show greater detail, contracting 120 a slice/node to hide detail, data value changing 112, label changing 114, moving 116 screen location, resizing 116 screen area, moving 116 location within a hierarchy relative to other nodes/slices of the hierarchy, creating 124 a pie chart/table/slice/node, and deleting 122 a pie chart/table/slice/node.

In some embodiments, as illustrated in FIG. 4 but not in FIG. 3 for example, the application 208 or other software operating according to the invention displays 126 a visual representation 320 of the path 220 taken by a user through the hierarchical table to reach a node 306 of the hierarchical table 216. The node in question might be currently displayed, or it might be one that is not presently displayed and which the user is seeking.

State information 312, 318 in the underlying data structure(s) 212 includes whether an item is a currently selected item 222. Other state information 312, 318 may include a time code indicating when the database values 218 were obtained, checksums, whether an item has been visited (displayed 102, 104), and other contextual and/or historical information.

Systems, Configured Media, and More

Figure 2:
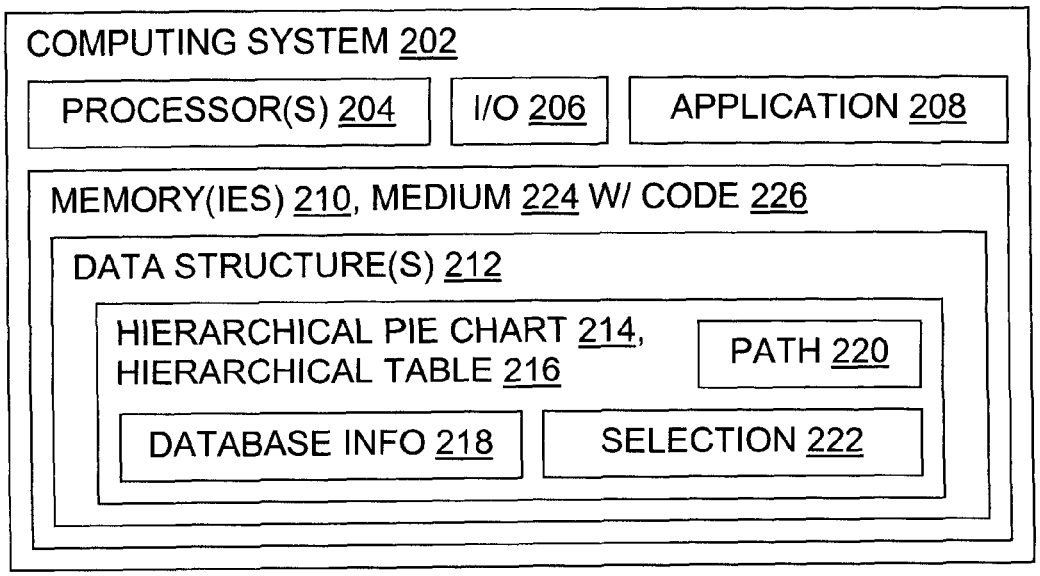
FIG. 2 is a block diagram illustrating systems, configured computer-readable media, memories with data structures, and other aspects of some embodiments of the present invention.

FIG. 2 illustrates some systems 202 according to the invention. The illustrated system 202 may include a computer with one or more processors 204, I/O support 206 (keyboard, mouse, screen, speakers, trackball, touch screen, stylus, microphone, network link, etc.) and with software such as an operating system, file system, and application programs 208. It may have RAM memory 210, and a hard disk and/or other nonvolatile memory 210. The system 202 may alternately or in addition include other devices capable of receiving database information 218 and of running (locally and/or with remote processing aid) an application 208. Such devices 202 include terminals, cell phones, mobile phones, wireless devices such as those sold under the Blackberry mark, personal digital assistants such as those sold under the Palm mark, and/or other devices, including handheld devices and others. Even if the device is a computer 202, it may be part of a client-server network or it may be a peer in a peer-to-peer network, or it may be a node in some other type of network.

Some embodiments include a computer-readable storage medium 224 such as a flash memory, CD, DVD, removable drive, or the like, which is configured to work in conjunction with a processor 204 to perform a process for managing data through corresponding 106 hierarchical pie charts and tables as discussed herein. A hard disk, RAM, tape, or other memory 210 in a device 202 may also be configured with code 226 to serve as a computer-readable storage medium 224 embodying the invention. The code 226 may include the application 208 and/or supporting code such as I/O 206 code. It will be understood that method embodiments and configured media embodiments are generally closely related, in the sense that many methods can be implemented using code that configures a medium, and that many configured media are configured by code which performs a method. Those of skill will understand that legally equivalent methods may also be performed using hardwired special-purpose hardware 202 which does not contain a ROM, PROM, EEPROM, RAM, or other memory medium embodying code that performs a method, but such implementations are expected to be unusual because of the generally high cost of implementing methods completely in silicon without a medium containing microcode or other code.

Additional Considerations

The present invention was conceived in connection with the design of analytics provider software, specifically the Discover brand product of Omniture, Inc., but it will be understood that the invention may also be embodied in software directed at other fields of use. Some of the intended operational capabilities of the Discover brand product may be helpful in further illustrating the invention and its use, and for that reason are noted below. This discussion does not limit the invention to the particular features described, or to the presentation and management of web analytics data. Prescriptive statements apply to the contemplated product, not necessarily to the embodied invention.

Some product embodiments include interactive graphs, which provide known graphing abilities and functions with some enhancements. One feature will allow users to change the type of graph, e.g., from a right click menu on the graph, with supported graphs including bar graphs, pie graphs, and line graphs. Another option on the right click menu will switch between 2D graphs and 3D graphs. A user can drill down from within the graph, by using the left-hand click. A Report Menu pops up, with a header "breakdown by". Upon selecting the breakdown, the chart and the data in the table (which correspond 106) should refresh to show that data 218. In this way the chart and the data are always interrelated. On mouse 326 over the graph section, the part of the graph (pie segment 304, bar) will be highlighted 110. When this mouse over happens, the data 322 in the table 216 that makes up (corresponds to 106) this segment 304 should be highlighted with a red box around the cells that provide the data.

In an active data table 216, shading and coloring are used as the breakdown of data progresses. The lowest breakdown level of data should always be in white, while a gradual gradient should be applied until the top layer 314 has the darkest gradient applied. The saturation of the gradient should not interfere with the reading of the data at any point. As to searching, at each level of the breakdown there should be the ability to filter the lowest breakdown level by specifying search criteria; this may appear to the right of the breakdown level. Upon applying the filter, only the data 218 in that breakdown level should be modified. Filter functions at higher breakdown levels should be grayed out and rendered inactive unless the user returns to that level of breakdown.

A path 220 provides context and left-hand breakdown identification. The product should provide the ability to identify what level(s) of breakdown the user is on and what breakdown path the user has taken. This may be especially useful when the breakdown contains enough rows that the user has the entire palette used in a single breakdown. When a user has broken down data and the data no longer shows 126 the path to get to the current level breakdown, the left hand side of the lowest level of data shows 320 the path 220. At the breakdown levels, searching should allow the user to search for a keyword and return the data 218 results with those keywords in it.

CONCLUSION

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. Limitations from one embodiment are not necessarily read into another.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic. Any apparent inconsistencies in the text associated with a given reference number should be interpreted to broaden to meaning of that reference number.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools, including without limitation except as expressly required, JavaScript code, as well as other scripting languages, HTML, XML, APIs, SDKs, network protocol stacks, assembly language, firmware, microcode, compilers, debuggers, and/or other languages and tools.

The embodiments discussed are illustrative of the application for the principles of the present invention. Numerous modifications and alternative embodiments can be devised without departing from the spirit and scope of the present invention.

I claim:

1. A method of displaying information in an interactive user interface, comprising:
   receiving web analytics data;
   simultaneously displaying;
      a hierarchical pie chart indicative of the web analytics data, the hierarchical pie chart comprising an upper-level pie chart comprising a plurality of upper-level slices; and
      a hierarchical table of nodes corresponding to the upper-level pie chart, the hierarchical table of nodes comprising an upper-level node corresponding to a particular upper-level slice of the upper-level pie chart;
   receiving an input indicative of a selection of the upper-level node or the particular upper-level slice, wherein the input is received while the lower-level pie chart and the lower level node are not currently being displayed; and
   in response to receiving the input, simultaneously displaying:
      a modified hierarchical pie chart; and
      a modified hierarchical table of nodes,
      wherein the modified hierarchical pie chart comprises:
         the upper-level pie chart comprising the plurality of upper-level slices; and
         a lower-level pie chart corresponding to the particular upper-level slice of the upper-level pie chart, the lower-level pie chart comprising a plurality of lower-level slices corresponding to a breakdown of the particular upper-level slice of the upper-level pie chart, wherein the lower-level pie chart and the upper-level pie chart are simultaneously displayed in association with one another; and
      wherein the modified hierarchical table of nodes comprises the hierarchical table of nodes expanded to include:
         the upper-level node corresponding to the particular upper-level slice of the upper-level pie chart; and
         a lower-level node corresponding to a lower-level slice of the lower-level pie chart,
         wherein the lower-level node is displayed as a sub-level of the upper-level node such that the hierarchical table of nodes comprises a visual display that is indicative of the lower-level node being associated with a lower-hierarchical-level of the modified hierarchical table, the upper-level node being associated with an upper-hierarchical-level of the modified hierarchical table, and the upper-hierarchical-level comprising the lower-hierarchical-level.

2. The method of claim 1, wherein the upper and lower-level slices and the upper and lower-level nodes are displayed simultaneously in a single window.

3. The method of claim 1, wherein at least one of the following conditions holds: a slice and a corresponding node each have the same data value displayed, a slice and a corresponding node each have the same label displayed.

4. The method of claim 1, further comprising at least one of: automatically showing a slice as selected in response to input which selects a node corresponding to that slice, automatically showing a node as selected in response to input which selects a slice corresponding to that node.

5. The method of claim 1, further comprising at least one of: automatically expanding a slice in response to input which expands a node corresponding to that slice, automatically expanding a node in response to input which expands a slice corresponding to that node.

6. The method of claim 1, further comprising at least one of: automatically changing a data value of a slice in response to input which changes a data value of a node corresponding to that slice, automatically changing a data value of a node in response to input which changes a data value of a slice corresponding to that node.

7. The method of claim 1, further comprising at least one of: automatically changing a label of a slice in response to input which changes a label of a node corresponding to that slice, automatically changing a label of a node in response to input which changes a label of a slice corresponding to that node.

8. The method of claim 1, further comprising at least one of: automatically deleting a slice in response to input which deletes a node corresponding to that slice, automatically deleting a node in response to input which deletes a slice corresponding to that node, automatically creating a slice in response to input which creates a node, automatically creating a node in response to input which creates a slice.

9. The method of claim 1, further comprising at least one of: selecting a slice in response to a user moving a cursor over the slice, selecting a node in response to a user moving a cursor over the node.

10. The method of claim 1, further comprising displaying a path taken by a user through the hierarchical table of nodes to reach a currently displayed node of the hierarchical table of nodes.

11. The method of claim 1, further comprising displaying a sub-level pie chart comprising a plurality of sub-level slices corresponding to a breakdown of at least one of the lower-level slices of the lower-level pie chart and also displaying in the hierarchical table of nodes, a sub-level node corresponding to one of the sub-level slices of the sub-level pie chart.

12. The method of claim 1, further comprising:
   determining that a breakdown of the particular upper-level slice or upper-level node comprises:
      a first lower-level node and slice that meets a cut-off threshold; and
      a second lower-level node and slice that meets the cut-off threshold; and
   wherein displaying the modified hierarchical pie chart comprises:
      displaying the first lower-level slice within the lower level pie chart; and
      not displaying the second lower-level slice within the lower-level pie chart; and wherein displaying the modified hierarchical table of nodes comprises:
displaying the first lower-level node within the hierarchical table of nodes as a sub-level of the upper-level node; and
displaying the second lower-level node within the hierarchical table of nodes as a sub-level of the upper-level node.

13. A computer readable storage medium, configured with instructions for performing a method of displaying information in an interactive user interface, the method comprising:
receiving web analytics data;
simultaneously displaying;
a hierarchical pie chart indicative of the web analytics data, the hierarchical pie chart comprising an upper-level pie chart comprising a plurality of upper-level slices; and
an expandable hierarchical table of nodes corresponding to the upper-level pie chart comprising an upper-level node corresponding to a particular upper-level slice of the upper-level pie chart;
receiving an input indicative of a selection of the upper-level node or the particular upper-level slice, wherein the input is received while the lower-level pie chart and the lower level node are not currently being displayed; and
in response to receiving the input, simultaneously displaying a modified hierarchical pie chart and a modified hierarchical table of nodes,
wherein the modified hierarchical pie chart comprises:
the upper-level pie chart comprising the plurality of upper-level slices; and
a lower-level pie chart corresponding to the particular upper-level slice of the upper-level pie chart, the lower-level pie chart comprising a plurality of lower-level slices corresponding to a breakdown of the particular upper-level slice of the upper-level pie chart; and
wherein the modified hierarchical table of nodes comprises the hierarchical table of nodes expanded to include:
the upper-level node corresponding to the particular upper-level slice of the upper-level pie chart; and
a lower-level node corresponding to a lower-level slice of the lower-level pie chart,
wherein the lower-level node is displayed as a sub-level of the upper-level node such that the hierarchical table of nodes comprises a visual display that is indicative of the lower-level node being associated with a lower-hierarchical-level of the modified hierarchical table, the upper-level node being associated with an upper-hierarchical-level of the modified hierarchical table, and the upper-hierarchical-level comprising the lower-hierarchical-level.

14. The configured medium of claim 13, wherein operations performable on pie charts and on tables include at least three of the following:
selecting, expanding, contracting, value changing, label changing, moving, resizing, creating, and deleting;
and wherein the method further comprises at least one of:
automatically performing an operation on the pie chart in response to input which causes performance of the operation on the corresponding table;
automatically performing an operation on the table in response to input which causes performance of the operation on the corresponding pie chart.

15. The configured medium of claim 13, wherein the method further comprises displaying with the modified hierarchical table of nodes a path taken by a user through the hierarchical table of nodes to reach a currently displayed node of the hierarchical table of nodes.

16. The configured medium of claim 13, wherein the method's displaying steps comprise displaying each slice and its corresponding node at least partially in a color which is not shown in other presently displayed slices and nodes.

17. The configured medium of claim 13, wherein the method's displaying steps comprise displaying each slice and its corresponding node with a textual label which differs from textual labels of other presently displayed slices and nodes.

18. A system, comprising:
a computer system configured to:
receive web analytics data;
simultaneously display:
a hierarchical pie chart indicative of the web analytics data, the hierarchical pie chart comprising an upper-level pie chart comprising a plurality of upper-level slices; and
a hierarchical table of nodes corresponding to the upper-level pie chart, the hierarchical table of nodes comprising an upper-level node corresponding to a particular upper-level slice of the upper-level pie chart;
receive an input indicative of a selection of the upper-level node or the particular upper-level slice, wherein the input is received while the lower-level pie chart and the lower level node are not currently being displayed; and
in response to receiving the input, simultaneously display a modified hierarchical pie chart and a modified hierarchical table of nodes,
wherein the modified hierarchical pie chart comprises:
the upper-level pie chart comprising the plurality of upper-level slices; and
a lower-level pie chart corresponding to the particular upper-level slice of the upper-level pie chart, the lower-level pie chart comprising a plurality of lower-level slices corresponding to a breakdown of the particular upper-level slice of the upper-level pie chart, wherein the lower-level pie chart and the upper-level pie chart are simultaneously displayed in association with one another; and
wherein the modified hierarchical table of nodes comprises the hierarchical table of nodes expanded to include:
the upper-level node corresponding to the particular upper-level slice of the upper-level pie chart; and
a lower-level node corresponding to a lower-level slice of the lower-level pie chart,
wherein the lower-level node is displayed as a sub-level of the upper-level node such that the hierarchical table of nodes comprises a visual display that is indicative of the lower-level node being associated with a lower-hierarchical-level of the modified hierarchical table, the upper-level node being associated with an upper-hierarchical-level of the modified hierarchical table, and the upper-hierarchical-level comprising the lower-hierarchical-level.

19. The system of claim 18, wherein the computer system is further configured to display with the modified hierarchical table of nodes a path taken by a user through the hierarchical table of nodes to reach a currently displayed node of the hierarchical table of nodes.

20. The system of claim 18, wherein operations performable on pie charts and on tables include at least three of the following:
selecting, expanding, contracting, value changing, label changing, moving, resizing, creating, and deleting;

and wherein the computer system is further configured to perform at least one of:

automatically perform an operation on the pie chart in response to input which causes performance of the operation on the corresponding table;

automatically perform an operation on the table in response to input which causes performance of the operation on the corresponding pie chart.

* * * * *